United States Patent [19]

Currie et al.

[11] Patent Number: 4,587,642

[45] Date of Patent: May 6, 1986

[54] SEISMIC DATA ENHANCEMENT METHOD AND APPARATUS

[75] Inventors: William S. Currie, Bellaire; David R. DeBaun, Houston, both of Tex.

[73] Assignee: Texaco Inc., White Plains, N.Y.

[21] Appl. No.: 447,039

[22] Filed: Dec. 6, 1982

[51] Int. Cl.$^4$ .............................................. G01V 1/00
[52] U.S. Cl. ........................................ 367/40; 367/60; 367/66; 364/574
[58] Field of Search ....................... 367/13, 21, 22, 23, 367/24, 40, 65, 66, 67, 76, 78, 79, 124, 905, 43, 60; 364/574, 575, 734, 812, 421

[56] References Cited

U.S. PATENT DOCUMENTS

| | | | |
|---|---|---|---|
| 3,182,181 | 5/1965 | Schumann | 364/734 |
| 3,518,414 | 6/1970 | Goodman et al. | 364/734 X |
| 3,881,097 | 4/1975 | Lehmann et al. | 364/734 X |
| 3,894,222 | 7/1975 | Siems | 364/574 |
| 4,209,672 | 6/1980 | Nitta et al. | 367/13 X |
| 4,246,652 | 1/1981 | Khan et al. | 367/47 X |
| 4,310,904 | 1/1982 | Ballard et al. | 367/131 |
| 4,314,347 | 2/1982 | Stokely | 364/574 |
| 4,317,182 | 2/1982 | Takase et al. | 364/734 |

OTHER PUBLICATIONS

Trimble, Charles R., What is Signal Averaging? Hewlett-Packard, Apr. 1968, pp. 1–7.

Primary Examiner—Charles T. Jordan
Assistant Examiner—Brian S. Steinberger
Attorney, Agent, or Firm—Robert A. Kulason; Ronald G. Gillespie

[57] ABSTRACT

A method of enhancing the signal to noise ratio of seismic data includes the steps of repeatedly obtaining, from at least one array of seismic detectors, analog signals representative of sensed vibrations or pressure waves. Each analog signal is converted to discrete digital values on a time correlation basis until a predetermined quantity of analog signals have been converted. In each time correlation, the two most positive digital values and the two most negative digital values are removed. The remaining values for each time correlation are averaged so as to provide a digital representation of the analog signals.

10 Claims, 2 Drawing Figures

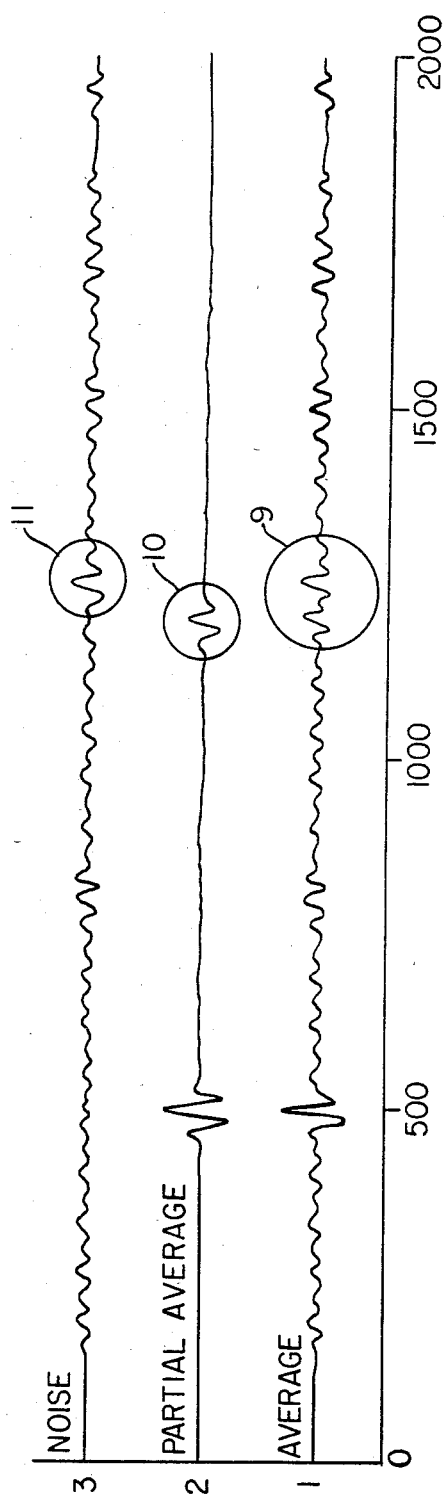

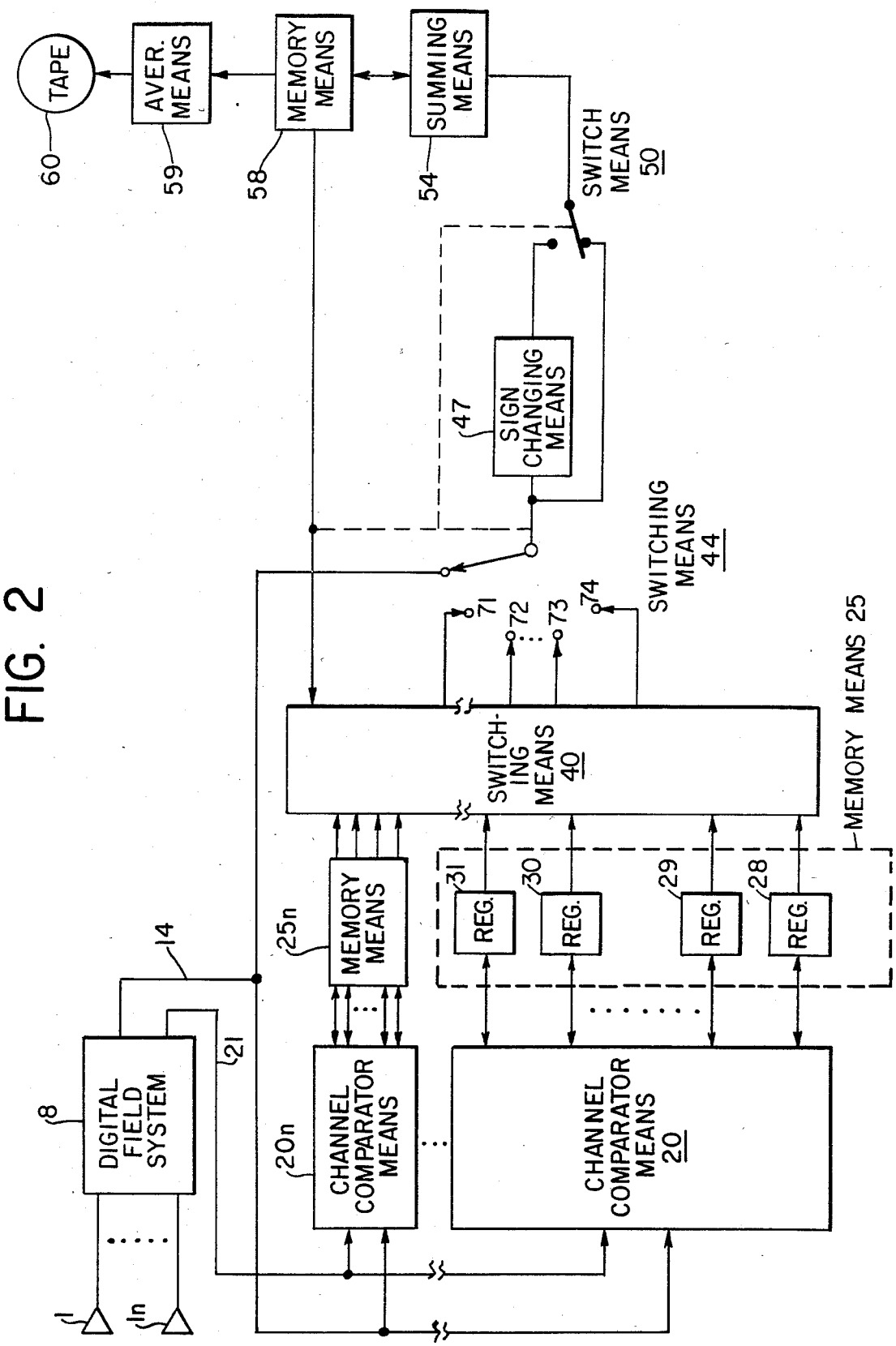

SEISMIC DATA ENHANCEMENT METHOD AND APPARATUS

BACKGROUND OF THE INVENTION

Field of the Invention

The present invention relates to seismic methods and apparatus in general and, more particularly, to enhancement of the signal to noise ratio of seismic data.

SUMMARY OF THE INVENTION

A method of enhancing the signal to noise ratio of seismic data includes the steps of repeatedly obtaining from at least one array of seismic detectors analog signals representative of sensed vibrations or pressure waves. Each analog signal is converted to discrete digital values on a time correlation basis until a predetermined quantity of analog signals have been converted. In each time correlation the two most positive digital values and the two most negative digital values are removed. The remaining values for each time correlation are averaged so as to provide a digital representation of the analog signals.

The objects and advantages of the invention will appear more fully hereinafter from a consideration of the detailed description which follows, taken together with the accompanying drawings wherein one embodiment of the invention is illustrated by way of example. It is to be expressly understood however that the drawings are for illustration purposes only and not to be construed as defining the limits of the invention.

DESCRIPTION OF THE DRAWINGS

FIG. 1 is a graphical representation of a noise wave form, a partial average form in accordance with the present invention and an average wave form which is in accordance with conventional practice.

FIG. 2 is a simplified block diagram of a seismic system constructed in accordance with the present invention.

DESCRIPTION OF THE INVENTION

Conventionally the averaging of several seismic traces, illustrated in FIG. 1, is intended to enhance the signal to noise ratio under the assumption that the desired signals are aligned in time on each trace and will constructively add while the undesired noise, and/or signals not aligned in time, will destructively accumulate when the traces are summed. This can be expressed mathematically as follows:

Let $$s_1(t) = s(t) + n_1(t)$$

$$s_2(t) = s(t) + n_2(t)$$

$$s_m(t) = s(t) + n_m(t)$$

represent m seismic traces where: each seismic trace, $s_i(t)$, contains a signal, $s(t)$, in common with the other traces and noise, $n_i(t)$, different from the noise on other traces, and averaging yields:

$$\bar{s}(t) = \frac{1}{m} \sum_{i=1}^{m} s_i(t) = s(t) + \frac{1}{m} \sum_{i=1}^{m} n_i(t).$$

In many instances averaging as indicated above is quite effective, especially in reducing background noise which is randomly present at all time on all traces. However, short time duration noise bursts and other seismic signals with magnitudes much larger than the desired seismic signals are often present, and while averaging diminishes their amplitude with respect to desired signals, they persist to a degree in the average that signal definition can become difficult. Partial averaging, as defined herein, provides a way to reduce the amplitude of such noise bursts while maintaining coherent signal amplitude; thus improving the signal to noise ratio and consequently the resolution of the seismic method.

Theoretically the $j^{th}$ seismic trace to be summed, $$s_j(t) = s(t) + n_j(t),$$

can also be expressed as:

$$s_j(i\Delta t) = s(i\Delta t) + n_j(i\Delta t);$$

$i = 0, 1, \ldots T/\Delta t;$ which represents a digital seismic trace containing amplitude samples from $s_j/(t)$ taken at sample times, 0, $\Delta t$, $2\Delta t, \ldots, n\Delta t$, during the time interval (0,T). The digital form of the average s(t) now becomes $$\bar{s}(i\Delta t) = \frac{1}{m} \sum_{j=1}^{m} s_j(i\Delta t), i = 0, 1, \ldots T/\Delta t,$$

which implies that the samples at each sample time, $i\Delta t$, are averaged to produce $s(i\Delta t)$. When this is done in a programmed computer or by special purpose digital devices, the opportunity to classify the samples at each sample time, $i\Delta t$, independently from other sample times becomes apparent, and discrimination can be imposed to eliminate from the average at each sample time those samples that classify by some a priori scheme as being detrimental to the average at $i\Delta t$. Thus some of the m samples at each sample time, $i\Delta t$, may be discarded independently from samples discarded at other sample times, allowing fewer than m samples to contribute to the average for each $i\Delta t$. Since fewer than the available m samples are averaged at each $i\Delta t$, the resulting average is termed a Partial Average.

Let the amplitude samples from the m traces at a particular sample time, $i\Delta t$, be $a_{1i}, a_{2i}, \ldots a_{mi}$. Arrange the m samples in increasing order $a_1 \leq a_2, \leq \ldots, \leq a_m$. For some chosen $k < m/2$, average the $m-2k$ samples $a_{k+1}, a_{k+2}, \ldots a_{m-k}$ to form:

$$\hat{s}(i\Delta t) = \frac{1}{m - 2k} \sum_{p=k+1}^{m-k} a_p,$$

Definition: $\hat{s}(i\Delta t)$, for all $i = 0, 1, \ldots, T/\Delta t$, is a Partial Average trace of order $m = 2k$.

Another way to describe $\hat{s}(i\Delta t)$ is to exclude from $\bar{s}(i\Delta t)$ the k smallest (most negative) and the k largest (most positive) samples at each sample time $i\Delta t$.

Thus those samples at each $i\Delta t$ which are extreme in the sense of distance from the average at each $i\Delta t$ will be discarded. If there are no samples that are extreme, then discarding a few of the samples to construct $\hat{s}(i\Delta t)$ makes little difference and $\hat{s}(i\Delta t)$ will be a good approximation of $\bar{s}(i\Delta t)$. However, if there are short duration high amplitude noise bursts their effect on $\hat{s}(i\Delta t)$ is assured to be less than their effect on $\bar{s}(i\Delta t)$. Thus the signal to noise ratio in the partial average can be an improvement over the signal to noise ratio in the average and seismic resolution can thereby be improved.

Vibroseis Application

The partial average scheme described above can be extremely beneficial to Vibroseis data acquisition and processing. The Vibroseis method presumes that the seismic trace has the form:

$$r(t) = \sum_k a_k s(t - T_k) + n(t), 0 \leq t \leq T,$$

$0 \leq t \leq T$,
where:
k indexes the reflections from the subsurface acoustic discontinuities,
$a_k$ is the amplitude of the $k^{th}$ reflection,
$T_k$ is the time of the $k^{th}$ reflection,
s(t) is the Vibroseis source signal initiated at t=0, and
n(t) is a noise.

Correlation of r(t) with s(t) when n(t) is wide band noise randomly present during the recording time produces results that favorably compare with dynamite sourced seismic recordings. The $k^{th}$ reflection in the correlated result contributes the autocorrelation of s(t) at the reflection time $T_k$ with amplitude $a_k$ just as with dynamite it is presumed that the source wavelet has been returned as a reflection signal at time $T_k$ with amplitude $a_k$. Furthermore, if the noise assumption stated above holds, the correlation procedure is capable of extracting reflection signals from high amplitude background noise. Signal to noise ratios much less than one can be tolerated.

On the other hand if noise consists of high amplitude short time duration pulses within the frequency spectrum of the Vibroseis sweep, correlation with the sweep can produce high amplitude long time duration oscillations in the correlated result prior to the time of occurrence of each of the high amplitude pulses. These oscillations are called correlation noise since they are the cross correlations of the sweep and the noise pulses. In practice they can be of sufficient amplitude to obscure the autocorrelation representation of the desired reflection signals.

The foregoing is the theory showing the statistical value of partial averaging to enhance data signals. It may be simplified by looking at FIG. 1. There is represented by level 1 the trace for a single channel covering several seismic events. A seismic event is an activation by conventional seismic methods, whether dynamite in the hole, or a Vibroseis sweep. Level 3 of FIG. 1 shows a noise trace developed over the same time intervals, while level 2 shows a seismic trace utilizing the partial averaging method of the present invention. As can be readily seen, the trace of level 2 is pretty smooth as compared to the trace of level 1 in the average stack, but what is even more important, is the excursion at level 2 identified by the circle 10. The corresponding area on level 1 is identified by circle 9. It is difficult to pick out the corresponding excursion of partial average level 2 in the level average 1 due to the excursion in level 1 from the noise shown by circle 11 on level 3.

In the following discussion as in the foregoing, the letter i represents the sample on a particular trace whike k represents the particular trace. In this regard with reference to FIG. 2, there is shown seismic arrays 11 through 11n. As is the conventional practice, seismic arrays include a plurality of seismic detectors providing signals along a single channel. In this regard there will be n channels with information being provided to a digital field system 8 which may be of the type manufactured by Texas Instruments as their Model No. DFS-V.

Digital field system 8 provides multiplexed digital data corresponding to vibrations sensed by seismic arrays 1 through 1n on line 14 to a plurality of channel comparator means 20 through 20n. Digital field system 8 accomplishes this by multiplexing the analog signals to provide a multiplexed analog signal which is converted to digital signals. Digital field system 8 also provides a control signal 21 which will activate channel comparator means 20 through 20n as hereinafter explained.

For ease of discussion only one channel will be discussed at this time. Channel comparator means 21 provides a plurality of outputs to corresponding registers, in this example four of them, 28 through 31, although there can be as many registers as desired. The operation of comparator means 20 is such that registers 28 through 31 will store the most negative digital information, the next most negative digital information, the most positive digital information, and the next most positive digital information provided by channel comparator means 20. As shown in the drawings, registers 28 through 31 also provide signals corresponding to their contents back to channel comparator means 20.

In operation, when channel comparator means 20 is activated it will compare the digital information signal on line 14 with the contents of registers 28 through 31. For example, let us assume that the digital value of signal 14 is more positive than any value in the registers 28 through 31. The current digital signal on line 14 is entered into register 28 and the old content of register 28 is entered into register 29. When the current digital signal on line 14 is less positive than the content of register 28 but more positive than register 29, the current digital signal on line 14 is entered into register 29. The contents in registers 30, 31 are entered in a similar manner as just explained.

The outputs of registers 28 through 31 are provided to switching means 40 which in turn select between the registers in memory means 25 or to other memory means 25n to be provided to another electronic switching means represented as a single pole multipositioned switch means 44.

The output of switch means 44 is provided to sign changer means 47 and to switch means 50. Switch means 50 is is essence of a single pole double throw electronic switch. The output of sign changer means 47 is also applied to switch means 50 and the output of switch means 50 is applied to summing means 54. Summing means 54 is also connected to memory means 58 in a manner so that information can be provided to memory means 58 as well as received from memory means 58. Memory means 58 is also connected to switching means 40 for controlling switching means 40 as hereinafter explained. An output of memory means 58 is provided to an average means 59 which provides an average signal, a tape in tape means 60 after completion of all operations, as hereinafter explained.

In the initial operation, the multiplexed signal on line 14 is provided through switch means 44 to switch means 50 which in turn provides summing means 54 and hence to the memory means 58. Memory means 58 stores the sum values of the digital values by time interval and channel. In response to the second seismic event, the information on line 14 is applied to the appropriate channel comparator means with control of the multiplexing signal 21 and this too is provided through switch means 44 and switch means 50 to summing means 54 and hence where it is summed with its corresponding channel and time interval with the previous value. This procedure is then carried on for all of the channels, for all of the seismic events. As a result, memory means 25 through memory means 25n has stored therein the two most positive values and the two most negative values for each channel for each time interval.

Memory means 58 provides a control signal to switching means 40 and switch means 44 and 50 so that now the input to summing means 54 from switch means 50 is essentially the output of sign changing means 47. Switching means 40 is controlled to apply for example the output from registers 28 through 31 to corresponding terminals 71, 72, 73 and 74, respectively of switch means 44. Switch means 44 is then controlled to switch through those positions. In effect the signs of the contents of registers 28 through 31 are changed and summed by summing means 54 to the stack of values for that particular channel for that particular time interval so as to remove the two most positive values and the two most negative values. Switch means 44 repeats this operation for each of the memory means 25 through 25n. The final contents of memory means 58 are averaged by averaging means 59 before being stored on tape in tape means 60.

The present invention as hereinbefore described concerns seismic data enhancement methods and apparatus in which a partial averaging of the seismic data is achieved to enhance the signal to noise ratio of the seismic data. The partial averaging in effect removes at least the two most negative values and the two most positive values of a stack of seismic information for a particular channel.

What is claimed is:

1. A method of enhancing the signal to noise ratio of seismic data comprising the steps of
   obtaining from at least one array of seismic detectors, an analog signal representative of sensed vibrations or pressure waves,
   converting the analog signal to discrete digital values on a time correlation basis,
   repeating the preceding steps until a predetermined quantity of analog signals have been converted,
   removing at least the two most positive digital values and the two most negative digital values, for each time correlation, and
   averaging the remaining digital values for each time correlation so as to provide a digital representation of the analog signals.

2. A method as described in claim 1 in which the first mentioned step is performed starting with the occurrence of each seismic event and continuing for a predetermined time period after the seismic event.

3. A method as described in claim 2 in which the number of positive digital values and the number of negative digital values removed are related to the number of analog signals obtained.

4. A method as described in claim 2 in which there is more than one array of seismic detectors, in which the obtaining step includes
   multiplexing the seismic analog signals from the arrays to provide a multiplexed seismic signal for each seismic event, and the converting step converts the multiplexed seismic signal to discrete digital values on a time correlation basis; further comprising storing the discrete digital values according to seismic detector array; and in which the removing step includes removing at least the two most positive digital values and the two most negative digital values from each stored digital values for each time correlation, and
   averaging the remaining stored digital values associated with corresponding seismic detector array so as to provide a digital representation of the analog signals provided by the seismic detector array.

5. A method as described in claim 4 in which the number of positive digital values and the number of negative digital values removed are related to the number of analog signals obtained.

6. A seismic system comprising:
   a seismic detector array means for sensing vibrations in an earth formation after said seismic event of a plurality of seismic events and providing corresponding analog signals,
   means for converting the analog signals to digital values on a time correlation basis,
   means for removing at least the two most positive digital values and the two most negative digital values for each time correlation,
   means for averaging the remaining digital values for each time correlation so as to provide a digital representation of the partial averaging of the analog signals.

7. A seismic system as described in claim 6 further comprising tape means connected to the averaging means for recording the averaged digital values from the averaging means on a tape.

8. A seismic system as described in claim 7 in which there is
   a plurality of seismic detector array means; and further comprising
   multiplexing means connecting the plurality of seismic detector array means to the converting means for multiplexing the analog signals from the plurality of seismic detector array means to provide a multiplexed analog signal to the converting means.

9. A seismic system as described in claim 8 in which the averaging means includes
   first memory means for storing digital values representative of the sum of the digital values for each time interval for each channel,
   summing means connected to the multiplexing means, to the removal means and to the first memory means for summing the multiplexed signals from the multiplexer means and the signals from the first memory means so as to provide signals representative of the sum values for each time interval for each channel to the first memory means for storage and for summing values from the removal means so as to remove the values so selected by the removal means from those totals, and
   averaging circuit means responsive to manual activation for averaging the stored digital values for each time interval for each channel to present averaged digital values for each time interval for each channel to tape means for recording on the tape.

10. A seismic system as described in claim 9 in which the removing means includes
    a plurality of channel comparator means connected to the multiplexed means and to the second memory means and responsive to a signal from the multiplexing means for comparing the portion of the multiplex digital signal associated with a particular channel and time interval with the appropriate stored digital values and entering a digital signal into the second memory when it is more positive than the stored positive values or more negative than the stored negative values, second memory means for storing at least the two most positive digital values and the two most negative digital values for each time interval for each channel and providing corresponding signals, means for changing the sign of digital values applied to it, and switch means connected to the multiplexing means, to the second memory means, to the summing means and to the sign changing means for initially providing the multiplexed digital signal to the summing means until all seismic data from all of the seismic events that have been obtained and then switching to the second mentioned memory means for providing the digital values from the second memory means to the sign changing means.

* * * * *